(12) United States Patent  (10) Patent No.: US 7,817,326 B1
Rennig et al.  (45) Date of Patent: Oct. 19, 2010

(54) ELECTROCHROME ELEMENT DRIVER

(75) Inventors: Fred Rennig, Nandlstadt (DE); Manuel Gaertner, Feldkirchen (DE)

(73) Assignee: STMicroelectronics Design and Application GmbH, Grasbrunn (DE)

( * ) Notice: Subject to any disclaimer, the term of this patent is extended or adjusted under 35 U.S.C. 154(b) by 17 days.

(21) Appl. No.: 12/420,620

(22) Filed: Apr. 8, 2009

(51) Int. Cl.
*G02F 1/15* (2006.01)
*G02F 1/153* (2006.01)

(52) U.S. Cl. .................. 359/265; 359/267; 359/268; 359/275

(58) Field of Classification Search .......... 359/265–275
See application file for complete search history.

(56) References Cited

U.S. PATENT DOCUMENTS

| | | | | |
|---|---|---|---|---|
| 4,322,133 A | * | 3/1982 | Uede et al. ................ | 359/267 |
| 4,528,275 A | * | 7/1985 | Hodge ........................ | 501/9 |
| 5,220,317 A | * | 6/1993 | Lynam et al. ............... | 345/105 |
| 5,384,578 A | * | 1/1995 | Lynam et al. ............... | 359/271 |
| 5,654,736 A | * | 8/1997 | Green et al. ................ | 345/105 |
| 6,259,426 B1 | * | 7/2001 | Harada et al. .............. | 345/581 |
| 2007/0085803 A1 | * | 4/2007 | Chu .......................... | 345/98 |

\* cited by examiner

*Primary Examiner*—Evelyn A. Lester
(74) *Attorney, Agent, or Firm*—Lisa K. Jorgenson; Robert Iannucci; Seed IP Law Group PLLC

(57) ABSTRACT

An electrochrome element driver supplies electrical power to an electrochrome element and includes an amplifying circuit, a variable resistor element, and a capacitor. The amplifying circuit has a control input for controlling a supply current flow to the electrochrome element, a feedback input, and an output. The variable resistor element has a first resistor terminal, a second resistor terminal coupled to the feedback input and a resistor control terminal for controlling a resistance of the variable resistor element. The resistor control terminal is coupled to the amplifying circuit output, the first resistor terminal is coupleable to a power source, and the second resistor terminal is coupleable to the electrochrome element such that a supply current path to the electrochrome element through the variable resistor element is formed. The capacitor is coupled to the resistor control terminal for effecting a stable behavior of the supply current flow to the electrochrome element.

30 Claims, 2 Drawing Sheets

ELECTROCHROME ELEMENT DRIVER

BACKGROUND

1. Technical Field

The present disclosure is directed to an electrochrome element driver and to an integrated circuit module for an electrochrome driver.

2. Description of the Related Art

Electrochromism is a phenomenon found in various chemical substances. These chemical substances, such as polyaniline or tungsten oxide, have the property of reversibly changing color when electrical power is supplied to them. Common electrochrome elements, also referred to as electrochromatic elements, are glass elements, whose levels of transparency change depending on the drive signals applied to them. In the automotive industry, electrochrome elements are for example used for tintable glass roofs or for rear view mirrors. In the case of a rear view mirror, the change in the transparency level of the mirror glass results in a change of the brightness of the reflection seen by the driver. As there are various situations, wherein the driver is blinded by the reflection in the rear view mirror, such as a following car inadvertently having the high beams switched on or the rising sun shining on the back side of the car, electrochrome element mirrors are an important safety feature.

As modern electrochrome element mirrors use substantial amounts of electrical power, they are commonly supplied by the car/truck battery in automotive applications. In order to drive the electrochrome element with appropriate voltages and currents, a previously used approach was a resistor divider circuit. In this approach, the car battery is connected to a first terminal of a resistor and the electrochrome element is connected between the second terminal of the resistor and ground. Accordingly, the voltage and current supplied to the electrochrome element are reduced as compared to a direct connection of the electrochrome element to the car battery, with the level of reduction being determined by the resistor value. However, a large variation of transparency level changing times has been observed over various operation scenarios. Moreover, it has been observed that the life expectancy of electrochrome elements in the automotive industry has been poor when compared to other applications, with a failure of the electrochrome element potentially being a safety hazard to the driver.

Accordingly, it would be beneficial to provide an electrochrome element driver that allows for an increased life expectancy of the driven electrochrome element.

BRIEF SUMMARY

According to a first embodiment, an electrochrome element driver for supplying electrical power to an electrochrome element is provided, wherein the electrochrome element driver comprises an amplifying circuit having an amplifying circuit control input for controlling a supply current flow to the electrochrome element, an amplifying circuit feedback input and an amplifying circuit output; a variable resistor element having a first resistor terminal, a second resistor terminal coupled to the amplifying circuit feedback input and a resistor control terminal for controlling a resistance of the variable resistor element, the resistor control terminal being coupled to the amplifying circuit output, wherein the first resistor terminal is coupleable to a power source and the second resistor terminal is coupleable to a first terminal of the electrochrome element such that a supply current path to the electrochrome element through the variable resistor element is formed; and a control loop capacitor coupled to the resistor control terminal for effecting a stable behavior of the supply current flow to the electrochrome element in the supply current path.

In an embodiment of the disclosure, the amplifying circuit is disposed on an integrated circuit, with the variable resistor element and the control loop capacitor being disposed external to the integrated circuit. The integrated circuit may further comprise an overcurrent protection switch coupling the first resistor terminal of the variable resistor element to a power source terminal of the integrated circuit.

According to one embodiment, an electrochrome element driver for supplying electrical power to an electrochrome element is provided, wherein the electrochrome element driver comprises an amplifying circuit having an amplifying circuit control input for controlling a supply current flow to the electrochrome element, an amplifying circuit feedback input and an amplifying circuit output; a first driving circuit, comprising a first variable resistor element having a first resistor terminal, a second resistor terminal coupled to the amplifying circuit feedback input in a first operation state and a resistor control terminal for controlling a resistance of the first variable resistor element, the resistor control terminal being coupled to the amplifying circuit output in the first operation state, wherein the first resistor terminal is coupleable to a power source and the second resistor terminal is coupleable to a first terminal of the electrochrome element such that a first supply current path to the electrochrome element through the first variable resistor element is formed, and a first control loop capacitor coupled to the resistor control terminal of the first variable resistor element for effecting a stable behavior of the supply current flow to the electrochrome element in the first supply current path; and a second driving circuit, comprising a second variable resistor element having a first resistor terminal, a second resistor terminal coupled to the amplifying circuit feedback input in a second operation state and a resistor control terminal for controlling a resistance of the second variable resistor element, the resistor control terminal being coupled to the amplifying circuit output in the second operation state, wherein the first resistor terminal is coupleable to a power source and the second resistor terminal is coupleable to a second terminal of the electrochrome element such that a second supply current path to the electrochrome element through the second variable resistor element is formed, and a second control loop capacitor coupled to the resistor control terminal of the second variable resistor element for effecting a stable behavior of the supply current flow to the electrochrome element in the second supply current path; wherein the supply current flow is directed to the first terminal of the electrochrome element in the first operation state and is directed to the second terminal of the electrochrome element in the second operation state.

In a further embodiment, the amplifying circuit and the second driving circuit are disposed on an integrated circuit, with the first driving circuit being disposed external to the integrated circuit.

BRIEF DESCRIPTION OF THE SEVERAL VIEWS OF THE DRAWINGS

Embodiments of the disclosure are described in greater detail below with reference to the Figures, wherein.

DETAILED DESCRIPTION

Figure 1:
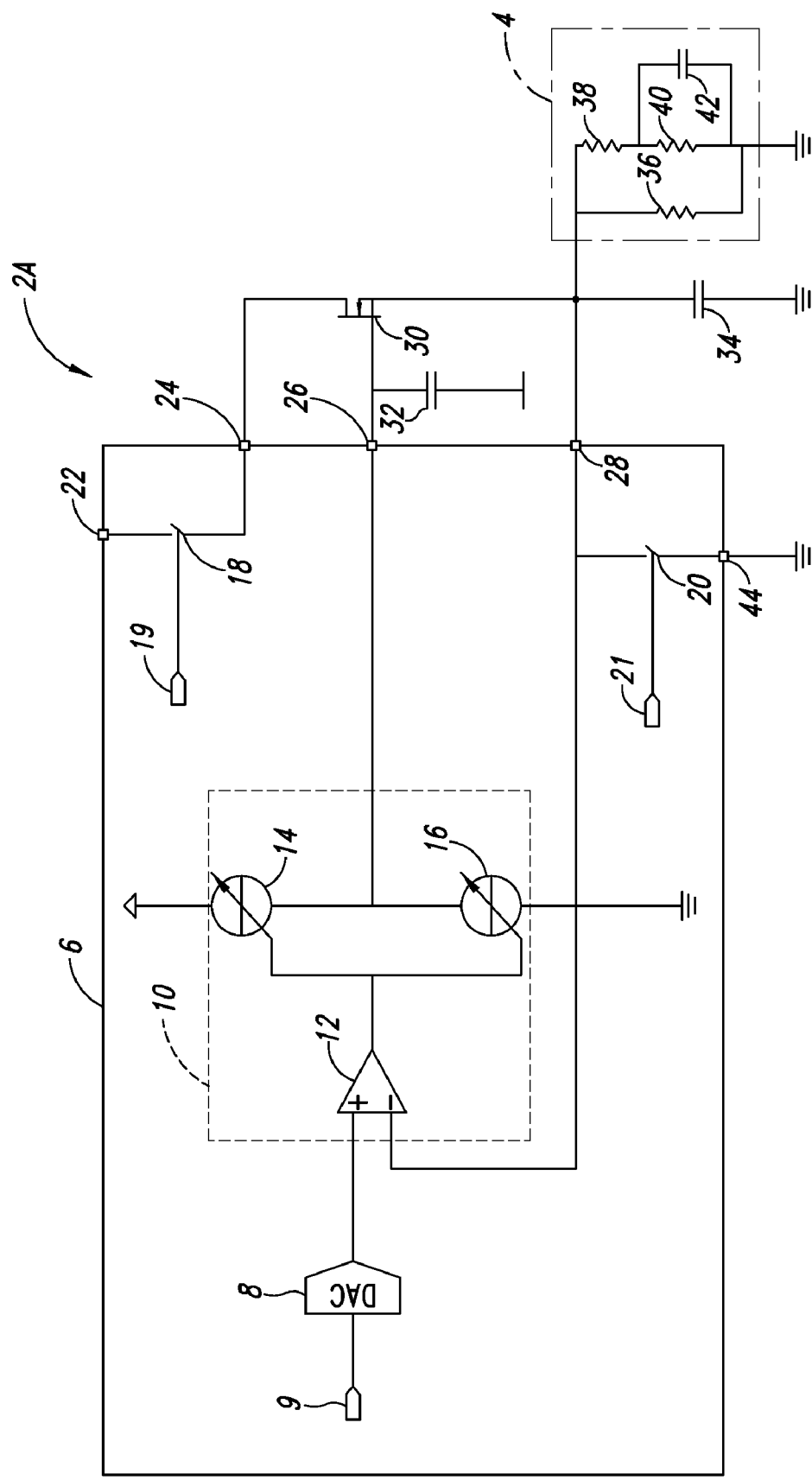
FIG. 1 shows a schematic diagram of an electrochrome element driver according to an exemplary embodiment.

FIG. 1 shows a schematic circuit representation of an electrochrome element driver 2A according to a first embodiment. In FIG. 1, the electrochrome element driver 2A is connected to an electrochrome element 4, as used for example in a car rear view mirror.

The electrochrome element driver comprises an integrated circuit 6. The integrated circuit 6 comprises a digital/analog converter 8 having a DAC control input 9. The integrated circuit further comprises an amplifying circuit 10 having two inputs, namely an amplifying circuit control input and an amplifying circuit feedback input, and an amplifying circuit output. In the exemplary embodiment of FIG. 1, the amplifying circuit 10 is a transconductance amplifier, more specifically a folded cascode amplifier, even more specifically a differential one-stage folded cascode amplifier. This transconductance amplifier comprises an operational amplifier 12 and two controlled current sources 14 and 16. The operational amplifier 12 has two inputs, namely an inverting input and a non-inverting input, and an output, which is coupled to control inputs of the two controlled current sources 14 and 16, controlling the same. The non-inverting input of the operational amplifier 12 corresponds to the amplifying circuit control input of the amplifying circuit 10. The inverting input of the operational amplifier 12 corresponds to the amplifying circuit feedback input of the amplifying circuit 10. The first controlled current source 14 is coupled between an on-chip power supply rail and the amplifying circuit output. The second controlled current source 16 is coupled between ground and the amplifying circuit output. Having above described configuration, the amplifying circuit 10 outputs a current at the amplifying circuit output, whose magnitude and direction is responsive to the difference in voltages applied at the non-inverting input and the inverting input of the operational amplifier 12. The relationship between the output current and the input voltage difference may be a monotonic relationship, for example a linear, mostly linear, or quadratic relationship. The linearity, quasilinearity, quadratic, or any other exemplary relationship may have technology-imposed limits. The amplifying circuit 10 may be seen as a controlled current source having a high output impedance.

The integrated circuit 6 comprises a number of terminals. A power source terminal 22 is coupleable to an external power source. In a vehicle, the external power source may be the vehicle battery. A safe power supply terminal 24 is coupled to the power source terminal 22 via an overcurrent protection switch 18, which is disposed on the integrated circuit 6. The overcurrent protection switch 18 is controlled by overcurrent protection switch control 19. The integrated circuit 6 further comprises an exterior control terminal 26, which is coupled to the amplifying circuit output. An electrochrome element connection terminal 28 is coupled to the amplifying circuit feedback input. The electrochrome element connection terminal 28 is also coupled to a ground terminal 44 via a fast discharge switch 20, which is controlled by fast discharge switch control 21, with the fast discharge switch 20 being disposed on the integrated circuit 6. This fast discharge connection to ground is optional.

The integrated circuit 6 is coupled to further components of the electrochrome element driver 2A, which are externally connected to the integrated circuit 6. The electrochrome element driver 2A comprises a variable resistor element 30, which has a first resistor terminal, a second resistor terminal and a resistor control terminal. In the exemplary embodiment of FIG. 1, the variable resistor element is a MOSFET transistor, more specifically an NMOS transistor, with the drain of the NMOS transistor being the first resistor terminal, the source of the NMOS transistor being the second resistor terminal and the gate of the NMOS transistor being the resistor control terminal. As is known in the art, the current $I_{DS}$ flowing through the channel of the MOSFET transistor from drain to source is a function of the drain source voltage $V_{DS}$ and the gate source voltage $V_{GS}$. As the resistance of the MOSFET transistor may be written as $V_{DS}/I_{DS}$, the MOSFET transistor may be seen as a variable resistor element, with the gate voltage $V_{GS}$ controlling the resistance of the MOSFET transistor by having an influence on $V_{GS}$. The drain of the NMOS transistor is coupled to the safe power supply terminal 24, the source of the NMOS transistor is coupled to the electrochrome element connection terminal 28, and the gate of the NMOS transistor is coupled to the exterior control terminal 26. The NMOS transistor does not provide negative voltages at its source terminal, which is advantageous, as negative voltages are potentially damaging to electrochrome elements.

The electrochrome element driver 2A comprises as a further external element a control loop capacitor 32. The control loop capacitor 32 is coupled between the resistor control terminal of the variable resistor element 30 and ground. Accordingly, one terminal of the control loop capacitor 32 and the resistor control terminal of the variable resistor element 30 are on the same potential as the exterior control terminal 26.

An optional component of the electrochrome element driver 2A is capacitor 34, which is coupled between the electrochrome element connection terminal 28 and ground. Capacitor 34 is responsible for smoothing out electromagnetic interference disturbing a stable power supply to the electrochrome element. Particularly, the capacitor 34 aims at avoiding distortion due to electromagnetic injection into the cable connecting the electrochrome element driver 2A and the electrochrome element 4. A typical capacitance value for the capacitor 34 is around 100 nF.

The electrochrome element driver 2A is coupled to electrochrome element 4 in FIG. 1. More specifically, a first terminal of electrochrome element 4 is coupled to the electrochrome element connection terminal 28 of the integrated circuit 6, with a second terminal of the electrochrome element 4 being coupled to ground. Accordingly, the second resistor terminal of the variable resistor element 30, the first terminal of the electrochrome element 4 and one terminal of the capacitor 34 are on the potential of the electrochrome element connection terminal 28 of the integrated circuit 6.

In the exemplary embodiment of FIG. 1, the electrochrome element 4 is represented as a combination of three resistive elements 36, 38 and 40 as well as one capacitive element 42. Not all of these four circuit elements belong to the electrochrome element itself, but together they represent the load as seen by the electrochrome element driver. Particularly, the resistor 36 is a protective resistor, which is connected in parallel to the actual electrochrome element in order to provide a current path for safe capacitive discharging. In parallel to the protective resistor 36, there is provided a series connection consisting of a first electrochrome element resistor 38 and a parallel circuit consisting of a second electrochrome element resistor 40 and an electrochrome element capacitor 42. The first electrochrome element resistor 38, the second electrochrome element resistor 40 and the electrochrome element capacitor 42 are a circuit element representation of an exemplary electrochrome element. A typical value for the protective resistor 36 may be 100Ω. In particular embodiments, the resistor 36 may also be an integral part to an electrochrome element mirror itself. In such a case, a typical value for the resistor 36 may be in the range of 2 to 6Ω, particularly around 4Ω.

The operation of the electrochrome element driver 2A of FIG. 1 is described as follows. For illustrative purposes, it is assumed that, at a starting point in time, the voltage applied to the DAC control input 9 is 0V, overcurrent protection switch 18 is open, fast discharge switch 20 is closed and the capacitors 32, 34 and 42 are in a discharged state, i.e., the voltage $V_{ECT}$ at the exterior control terminal 26 is 0V and the voltage $V_{EECT}$ at the electrochrome element connection terminal is 0V. Consequently, there is no current flow through the electrochrome element 4, which in turn means that the glass of the exemplary electrochrome element 4 of FIG. 1 is not brought into a state of reduced transparency, i.e., the exemplary car rear view mirror is not in a tinted state.

Assume that it is then determined that a desired driving voltage $V_D$ is to be applied to the first terminal of the electrochrome element 4 in order to cause a desired transparency reduction of the electrochrome element. This determination may be carried out by a driver controller (not shown), which may be disposed on the integrated circuit 6 or outside the integrated circuit 6. This driver controller may have an output of a brightness sensor or a light sensor as an input, such that it can decide when a reduced transparency of the electrochrome element is appropriate for the driver such that the driver is not blinded when looking into the rear view mirror. The driver controller may be a microcontroller or any other suitable kind of controller, which may be programmable so that the particular transparency characteristics of the electrochrome element used may be stored as a function of the voltage at the first terminal of the electrochrome element. Consequently, the driver controller may cause the electrochrome element to have a desired transparency level by requesting a particular voltage level $V_D$.

The driver controller supplies a digital representation of the desired driving voltage $V_D$ to the DAC control input 9 and causes overcurrent protection switch 18 to be closed and fast discharge switch 20 to be opened via the overcurrent protection switch control 19 and the fast discharge switch control 21, respectively. The digital/analog converter 8 converts the digital representation of the desired driving voltage $V_D$ into an analog voltage signal and applies this control signal to the amplifying circuit control input, specifically to the non-inverting input of the operational amplifier 12. As the voltage $V_{EECT}$ at the electrochrome element connection terminal is 0V at this starting point, a positive difference between the desired driving voltage $V_D$ and $V_{EECT}$ is detected by operational amplifier 12. Accordingly, a positive current is output by amplifying circuit 10, which starts charging control loop capacitor 32. As a consequence, the voltage $V_{ECT}$ at the exterior control terminal 26 increases, which increases the gate to source voltage $V_{GS}$ of the NMOS transistor, which in turn leads to an increase of the current $I_{DS}$ from drain to source of the NMOS transistor (as soon as $V_{GS}$ is larger than the threshold current $V_t$ of the NMOS transistor). The supply current $I_{DS}$ charges the capacitor 34 and the electrochrome element capacitor 42 and results in a current flow through the protective resistor 34 as well as through the first electrochrome element resistor 38 and the second electrochrome element resistor 40. The exact distribution of the supply current $I_{DS}$ to the capacitor 34, to the electrochrome element capacitor 42 and to the resistive branches of the electrochrome element 4 depends on the relative resistive and capacitive values of these circuit elements and the momentary voltage $V_{EECT}$ at the electrochrome element connection terminal 28, as is apparent from basic laws of electric circuits. At the start of this electrochrome element driving process, however, the supply current $I_{DS}$ results in an increase of the voltage $V_{EECT}$ at the electrochrome element connection terminal 28.

Subsequently, the control loop consisting of the amplifying circuit 10, the control loop capacitor 32, the variable resistor element 30 and their according connections provides for the voltage $V_{EECT}$ at the electrochrome element connection terminal 28 to become the desired driving voltage $V_D$. In other words, the control loop constantly works towards making the voltage difference between the amplifying circuit control input and the amplifying circuit feedback input zero. When the voltage $V_{EECT}$ is lower than $V_D$, the amplifying circuit 10 outputs a positive current, which increases the charge on the control loop capacitor 32, which increases the supply current through the variable resistor element 30, which increases the voltage $V_{EECT}$. In contrast thereto, when the voltage $V_{EECT}$ is higher than $V_D$, the amplifying circuit 10 outputs a negative current, which decreases the charge on the control loop capacitor 32, which decreases the supply current through the variable resistor element 30, which decreases the voltage $V_{EECT}$.

The control loop capacitor 32 ensures that the control loop exhibits a stable behavior. The term stable behavior refers to a property of the control loop which results in the controlled voltage converging to the control voltage. In the exemplary embodiment of FIG. 1, the voltage $V_{EECT}$ converges in operation to the control voltage $V_D$ applied to the amplifying circuit control input. In other words, a scenario, in which the voltage $V_{EECT}$ oscillates between voltage values lower than the desired driving voltage $V_D$ and voltage values higher than the desired driving voltage $V_D$ without converging to the desired driving voltage $V_D$, is prevented. In control theory terms, an inherently stable control system having one pole is provided, as long as the control loop capacitor is larger than a minimum threshold value. Consequently, the voltage $V_{EECT}$ at the electrochrome element connection terminal 28 is kept constant in a steady state after an initial transient process. This also means that a static supply current flows through the resistive devices of the electrochrome element 4. Also, an overshoot of the voltage $V_{EECT}$ above the maximum tolerable level for the electrochrome element 4 may be prevented by choosing a high capacitance value for the control loop capacitor 32.

A great advantage is that it is the voltage $V_{EECT}$ at the electrochrome element connection terminal 28 of the integrated circuit 6, which is applied to the first terminal of the electrochrome element 4, that is controlled directly. Therefore, the voltage level $V_B$ supplied to the integrated circuit 6 at power source terminal 22 by an external power source, such as the vehicle battery, does not have an influence on the static behavior of the supply current to the electrochrome element. The voltage $V_{EECT}$ at the electrochrome element connection terminal 28 is controlled to equal the desired driving voltage $V_D$ in operation. Accordingly, the supply current through the electrochrome element 4 has a fixed static value, determined by $V_D$ and the resistance values of the resistive elements 36, 38 and 40. Therefore, the power consumed by the electrochrome element in a steady state is fixed. However, the battery voltage $V_B$ of the vehicle battery may have a wide range of different values, depending among others on the battery model, on the charging state of the battery, on the operation conditions (for example temperature) and on which further components of the vehicle are connected to the battery at a given moment. Typically, the battery voltage of a car battery may range between 5V and 40V. In most operation conditions, it may range between 8V and 18V. Consequently, with the voltage $V_{EECT}$ being kept at $V_D$ by the control loop, the drain source voltage $V_{DS}$ of the NMOS transistor 30 may vary within a wide range as well. Through the control of $V_{GS}$ via the control loop, however, the resistance of the NMOS transistor 30 may be set in such a way that the drain source current $I_{DS}$ through the NMOS transistor equals the desired static current through the electrochrome element 4. The power dissipation in the variable resistor element 30 is adjusted such that the power dissipated in the electrochrome element is kept at a desired level, once a static state is reached. This means that the electrochrome element may be provided with the voltage and current levels that ensure a maximum life expectancy for the electrochrome element, regardless of the voltage level supplied by the external power source.

The control loop does not only increase the life expectancy of the electrochrome element by providing a desired controlled voltage $V_D$ at the electrochrome element connection terminal 28 in the static state, but also by ensuring a desired dynamic behavior in transient states. Transient states are situations in which the operating conditions change and the control loop aims at bringing $V_{EECT}$ to or keeping $V_{EECT}$ at a desired voltage level. One example is the process of bringing $V_{EECT}$ from 0V to $V_D$, as described above. Another example is a variation in the battery voltage $V_B$, while the transparency of the rear view mirror glass is reduced, i.e., while a voltage $V_D$ is supplied to the first terminal of the electrochrome element 4. As the first electrochrome element resistor 38 commonly has a low resistance value in typical modern electrochrome elements, a sudden change of the voltage at the first terminal of the electrochrome element 4 would lead to a high current to electrochrome element capacitor 42. This phenomenon, which is detrimental to the life expectancy of the electrochrome element, is called "inrush current" and is commonly encountered when electrochrome elements are connected to a power source via a voltage dividing resistor. In the exemplary embodiment of the invention of FIG. 1, this detrimental effect may be prevented by using a control loop capacitor 32 with a high capacitance value, preferably greater than 2 nF, more preferably greater than 3 nF. Different capacitance values are possible as well. Upon closing of overcurrent protection switch 18 and supplying $V_D$ to the amplifying circuit control input of the amplifying circuit 10, the current provided at the amplifying circuit output provides for a slow increase of the voltage $V_{ECT}$ at the exterior control terminal 26, because the control loop capacitor 32 has a high capacitance value. Accordingly, $V_{GS}$ increases slowly, which in turn provides for a slowly increasing supply current flow through the variable resistor element 30 to the electrochrome element 4. Consequently, large inrush current values are prevented. In other words, a high capacitance value control loop capacitor 32 slows down the control of the voltage $V_{EECT}$ at the electrochrome element connection terminal 28. As a consequence, the transparency state change of the electrochrome element is slowed down as well. However, as a time span for a transparency change of an electrochrome element glass in the order of seconds is sufficient for automotive and other applications, excessive inrush current levels may be prevented without negative consequences for the user of the electrochrome element. Moreover, slowing down the transparency state change of the electrochrome element allows for setting a more uniform transparency state change time over many operating conditions, which leads to the behavior of the electrochrome element being more predictable by the user, which is of additional convenience to the user.

Typical static operating values for an electrochrome element are a terminal voltage between 0V and 1.5V and a current flow between 150 mA and 200 mA.

The exemplary embodiment of the invention of FIG. 1 has the further advantage that the circuit elements of the electrochrome element driver may be partially placed on the integrated circuit 6 and partially placed outside the integrated circuit 6, respectively depending on the size of the circuit elements and the power dissipation associated with the circuit elements. As the control loop capacitor 32 may be chosen to have a substantial capacitance value, which results in high area/volume requirements for the control loop capacitor 32, it is placed outside the integrated circuit 6 saving precious integrated circuit area. Also, the variable resistor element 30 is placed outside the integrated circuit 6, because the heat generated by the power dissipation in the variable resistor element 30 may be led away from an external circuit element more easily than from within the integrated circuit 6.

On the other hand, the amplifying circuit 10 may be easily implemented on an integrated circuit making use of readily available resources on an integrated circuit, such as the ground rail and the on-chip power supply rail. Also, the overcurrent protection switch 18 may be controlled by an integrated circuit diagnostic system, which observes voltage and/or current levels at the terminals of the integrated circuit or within the integrated circuit. Accordingly, this integrated circuit diagnostic system may be adapted in such a way that it opens the overcurrent protection switch when a current flow from the power source terminal 22 to the safe power supply terminal 24 is detected that is potentially damaging to the variable resistor element 30. Additionally/alternatively, the integrated circuit diagnostic system may be adapted in a such way that it opens the overcurrent protection switch when a voltage level at the power source terminal 22 is detected that is potentially damaging to the variable resistor element 30. As a consequence, a low quality, cheap variable resistor element 30 may be used, with its integrity being ensured by the overcurrent protection switch 18. As an example, a transistor may be used as the variable resistor element 30 that has a maximum drain voltage of 20V, even though the vehicle battery voltage may go up to 40V.

For bringing the electrochrome element 4 back into its original state, i.e., for restoring the full transparency of the rear view mirror glass in the exemplary embodiment of FIG. 1, a digital value representing 0V is applied to the digital/analog converter 8 via the DAC control input 9. As a consequence, a voltage of 0V is applied to the amplifying circuit control input. The control loop will subsequently draw the voltage $V_{EECT}$ at the electrochrome element control terminal 28 to 0V. This is achieved through a negative current at the amplifying circuit output, which discharges the control loop capacitor 32, which eventually stops the supply current through the NMOS transistor 30, which in turn leads to the capacitor 34 and the electrochrome element capacitor 42 being discharged via the protective resistor 36 as well as the first electrochrome element resistor 38 and the second electrochrome element resistor 40. For a faster discharge of these capacitive circuit elements, the fast discharge switch 20 may be closed, such that the charge will find a path to ground exhibiting less resistive behavior. In this way, a fast restoration of the fully transparent state of the rear view mirror glass is provided. Additionally, the overcurrent protection switch 18 may be opened in this process as well in order to stop the supply current flow to the electrochrome element 4 immediately and to not wait for the control loop to effect a stop after a reaction time which depends on the capacitive value of the control loop capacitor 32. Another discharge switch maybe coupled between exterior control terminal 26 and ground in order to support a fast discharge of the control loop capacitor 32. This may effect a fast stop of the supply current flow to the electrochrome element 4 as well.

It is pointed out that the integrated circuit 6 according to the exemplary embodiment of FIG. 1 allows for a wide variety of electrochrome element driver designs for driving a wide variety of electrochrome elements. As discussed before, many sorts of electrochrome elements 4 may be connected to the electrochrome element connection terminal 28, because the desired supply voltage can be set accordingly via the amplifying circuit control input. Furthermore, the power supply terminal 22 may be connected to a wide range of power supplies, since the power dissipation in the variable resistor element 30 is controlled in such a way that the desired power is supplied to the electrochrome element. Also, no particular high quality device needs to be used as the variable resistor element, since the overcurrent protection switch may be controlled in such a way that dangerous current/voltage levels are prevented. Moreover, the dynamic behavior of the electrochrome element may be set by the choice of the control loop capacitor 32 and by whether or not the fast discharge switch is closed in discharge operations. Consequently, the integrated circuit 6 is a universally usable component that needs a minimum number of external components for forming an extremely robust electrochrome element driver.

However, should a particular electrochrome element have low static and/or dynamic current requirements, the power dissipated in the variable resistor element may be low so that it can be an option to provide an integrated circuit which includes the variable resistor element. Also, a particular electrochrome element may have such properties that a comparably small control loop capacitor is sufficient for achieving a desired dynamic behavior. The control loop capacitor may be placed on the integrated circuit in such a case, as it does not consume a large amount of area. Consequently, it may be advantageous to provide an integrated circuit with the variable resistor element and/or the control loop capacitor and/or the smoothing capacitor disposed on the integrated circuit, which leads to an even more integrated solution.

Furthermore, it is pointed out that the integrated circuit may comprise only the components shown in FIG. 1. Alternatively, the integrated circuit may be a multi-functional integrated circuit that may additionally carry out other tasks with additional components. In the case of the electrochrome element being a rear view mirror glass, the integrated circuit may also have functionality to control the mechanical position of the mirror, to heat the mirror, etc. This has the advantage that at least a substantial portion of the electrochrome element driver may be integrated in an integrated circuit that is already in use in the rear view mirror environment.

Figure 2:
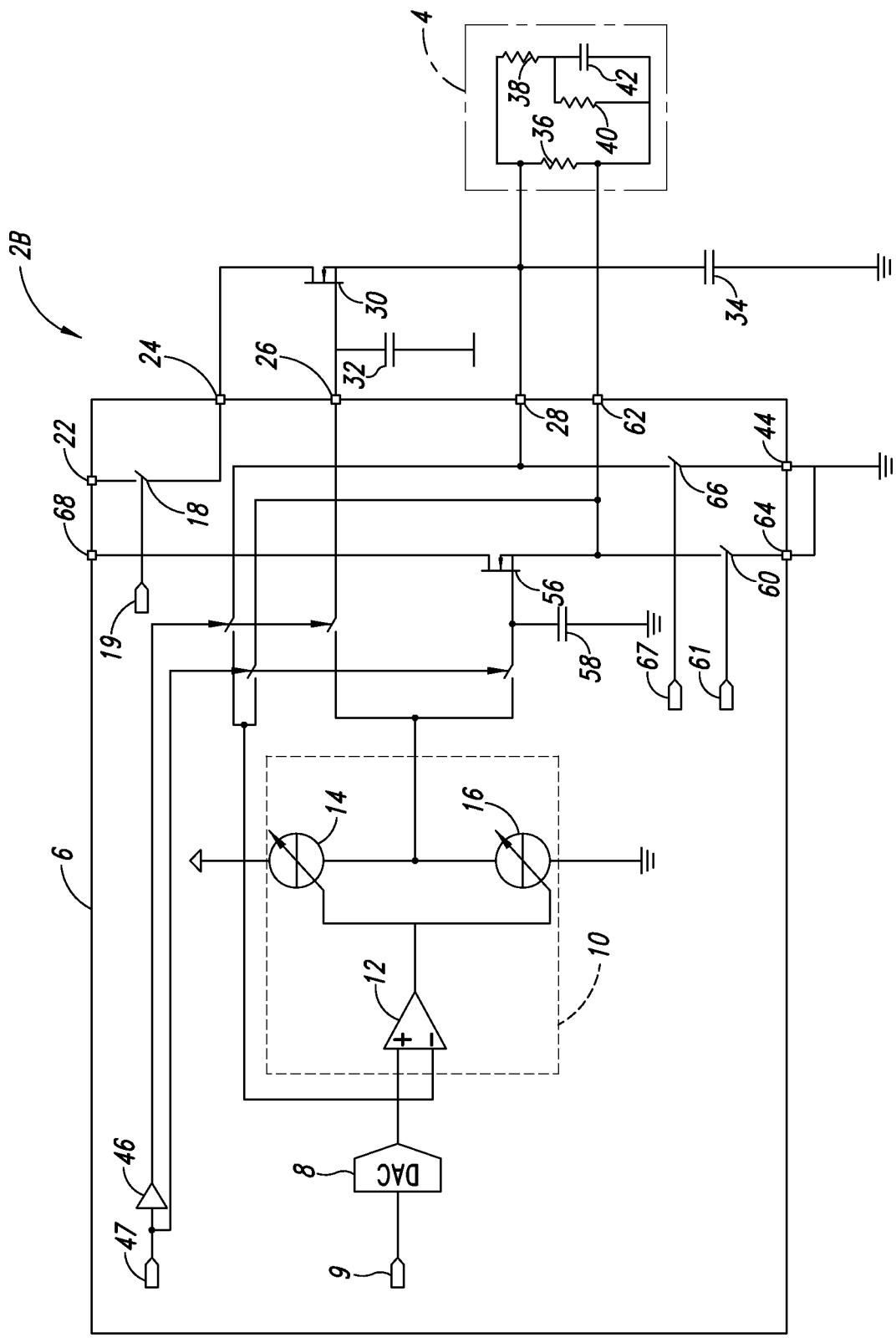
FIG. 2 shows a schematic diagram of an electrochrome element driver according to an exemplary embodiment.

Reference is now made to FIG. 2, which shows a schematic circuit representation of an electrochrome element driver 2B according to the second embodiment. Circuit elements depicted in FIG. 2 that correspond to circuit elements depicted in FIG. 1 are provided with the same reference numerals. As will be discussed below, the electrochrome element driver of FIG. 2 may in a first operation state provide the same functionality as the electrochrome element driver of FIG. 1. Consequently, the discussion of the structure and operation of the electrochrome element driver of FIG. 2 will be kept brief, where it corresponds to the structure and operation of the electrochrome element driver of FIG. 1. The remarks and advantages stated in connection with the electrochrome element driver of FIG. 1 equally apply to the electrochrome element driver of FIG. 2.

The electrochrome element driver 2B of FIG. 2 comprises an integrated circuit 6. The integrated circuit comprises an amplifying circuit 10, whose amplifying circuit control input is coupled to a digital/analog converter 8, which in turn is controlled by DAC control input 9. The integrated circuit 6 comprises a first power source terminal 22, a second power source terminal 68, a safe power supply terminal 24, an exterior control terminal 26, a first electrochrome element connection terminal 28, a second electrochrome element connection terminal 62, a first ground terminal 44, and a second ground terminal 64. The first and second power source terminals 22 and 68 are coupleable to one or more external power sources, for example a vehicle battery. The first and second ground terminals 44 and 64 are coupled to ground.

The electrochrome element driver 2B comprises a first variable resistor element 30 and a first control loop capacitor 32. The first variable resistor element 30 and the first control loop capacitor 32 are disposed outside the integrated circuit 6 and form a first driving circuit. The first resistor terminal of the first variable resistor element 30 is coupled to the safe power supply terminal 24, the second resistor terminal of the first variable resistor element 30 is coupled to the first electrochrome element connection terminal 28, and the resistor control terminal of the first variable resistor element 30 is coupled to the exterior control terminal 26. One terminal of the first control loop capacitor 32 is coupled to the exterior control terminal 26, with the second terminal of the first control loop capacitor 32 being coupled to ground.

The integrated circuit 6 of the electrochrome element driver 2B further comprises a second variable resistor element 56 having a first resistor terminal, a second resistor terminal and a resistor control terminal. The second variable resistor element 56 forms a second driving circuit together with a second control loop capacitor 58, whose one terminal is coupled to the resistor control terminal of the second variable resistor element 56 and whose second terminal is coupled to ground. The first resistor terminal of the second variable resistor element 56 is coupled to the second power source terminal 68 and the second resistor terminal of the second variable resistor element is coupled to the second electrochrome element connection terminal 62. The second variable resistor element 56 is a MOSFET transistor, more specifically an NMOS transistor, as the first variable resistor element 30.

The amplifying circuit output of the amplifying circuit 10 is coupled to the exterior control terminal 26 via a first control path switch 52 and to the resistor control terminal of the second variable resistor element 56 via a second control path switch 54. The term "coupled" is used herein to describe a connection between components that may be in a conducting state in all operating conditions, but does not necessarily have to be in a conducting state in all operating conditions. In other words, two components having a switch interposed therebetween, which may be in an open or in a closed state, are referred to as being coupled. However, two components having a direct connection without an interposed switch may also be described as being coupled.

The first electrochrome element connection terminal 28 is coupled to the amplifying circuit feedback input via a first feedback path switch 48. The second electrochrome element connection terminal 62 is coupled to the amplifying circuit feedback input via a second feedback path switch 50. The first control path switch 52, the second control path switch 54, the first feedback path switch 48 and the second feedback path switch 50 are controlled by a supply current direction control 47 and an inverter 46. The control is carried out in such a way that either the first control path switch 52 and the first feedback path switch 48 are closed, with the second control path switch 54 and the second feedback path switch 50 being open, or that the second control path switch 54 and the second feedback path switch 50 are closed, with the first control path switch 52 and the first feedback path switch 48 being open.

The first electrochrome element connection terminal 28 is further coupled to the first ground terminal 44 via a first grounding path switch 66, which is controlled by first grounding path switch control 67. The second electrochrome element connection terminal 62 is further coupled to the second ground terminal 64 via a second grounding path switch 60, which is controlled by second grounding path switch control 61. The first power source terminal 22 is coupled to the safe power supply terminal 24 via an overcurrent protection switch 18, which is controlled by overcurrent protection switch control 19.

The electrochrome element driver further comprises a capacitor 34 for smoothing out electromagnetic interference disturbing a stable power supply to the electrochrome element 4. The capacitor 34 is coupled between the first electrochrome element connection terminal 28 and ground.

The electrochrome element 4 is coupled to the first electrochrome element connection terminal 28 with its first terminal and coupled to the second electrochrome element connection terminal 62 with its second terminal. The electrochrome element 4 of FIG. 2 comprises the same load model components as the electrochrome element 4 of FIG. 1.

The operation of the electrochrome element driver of FIG. 2 is described as follows. In a first operation state, the supply current direction control 47 sends out a logical signal, which opens the second control path switch 54 and the second feedback path switch 50. As said logical signal is inverted by inverter 46, the first control path switch 52 and the first feedback path switch 48 are brought into a closed position by said logical signal. Additionally, second grounding path switch control 61 closes the second grounding path switch 60 and first grounding path switch control 67 opens the first grounding path switch 66. Also, the overcurrent protection switch 18 is closed and a digital signal representing a desired driving voltage $V_D$ is applied to DAC control input 9. As a consequence, a first supply current path is formed from the external power source through the first power source terminal 22, the safe power supply terminal 24, through the first variable resistor element 30, to the first terminal of the electrochrome element 4, through the electrochrome element 4, from the second terminal of the electrochrome element 4 to the second electrochrome element connection terminal 62 and through the second ground terminal 64 to ground. This operation state substantially corresponds to the driving operation of the electrochrome element in FIG. 1. Therefore, an in depth discussion is omitted for brevity. A difference is that the second terminal of the electrochrome element 4 is not connected to ground directly, as it was in the exemplary embodiment of FIG. 1, but through the integrated circuit 6. As in the exemplary embodiment of FIG. 1, the voltage at the first electrochrome element connection terminal 28 is controlled to be $V_D$ via the control loop consisting of the amplifying circuit 10, the first variable resistor element 30 and the first control loop capacitor 32. Again, the first control loop capacitor 32 provides for a stable behavior of the supply current to the electrochrome element 4 along the first supply current path and provides for a desired dynamic behavior in transient situations.

In a second operating state, the supply current direction control 47 sends out a logical signal, which closes the second control path switch 54 and the second feedback path switch 50 and opens the first control path switch 52 and the first feedback path switch 48 through the inverter 46. Also, first grounding path switch control 67 closes the first grounding path switch 66 and second grounding path switch control 61 opens the second grounding path switch 60. As a consequence, a second supply current path is formed from the external power source through the second power source terminal 68, through the second variable resistor element 56, to the second terminal of the electrochrome element 4, through the electrochrome element 4, from the first terminal of the electrochrome element 4 to the first electrochrome element connection terminal 28 and through the first ground terminal 44 to ground. Accordingly, the supply current flow through the electrochrome element 4 is effected in a second supply current direction in the second operation state, the second supply current direction being opposite a first supply current direction effected in the first operation state.

The basic current supply principle in the second operation state is similar to the first operation state. The voltage at the second electrochrome element connection terminal 62 is controlled to be the desired driving voltage $V_D$ applied to the amplifying circuit control input via the control loop consisting of the amplifying circuit 10, the second variable resistor element 56 and the second control loop capacitor 58. The second control loop capacitor 58 provides for a stable behavior of the supply current flow in the second supply current path and determines the dynamic behavior at the electrochrome element 4 in transient situations, such as the time following the switch from the first operation state to the second operation state.

There may be additional switches disposed between the exterior control terminal 26 and ground and between the resistor control terminal of the second variable resistor element 56 and ground, respectively. With these switches, an optional fast discharge of the first and second control loop capacitors 32 and 58 may be ensured, respectively. Particularly in the case of a switch from the first operation state to the second operation state and vice versa, such a fast discharge may ensure that only one of the first supply current path and the second supply current path carries current at any given time.

The electrochrome element driver 2B that is capable of supplying current to the electrochrome element 4 in two different directions has a number of advantages. The charging process and the discharging process of the electrochrome element 4, particularly of the electrochrome element capacitor 42, may be controlled individually by two different driving circuits. Hence, both processes may be adapted in such a way that the life expectancy of the electrochrome element 4 is increased. Also, both processes may be adapted to provide appropriate transparency reduction and transparency increase times to the user. The dynamic and static behavior of the electrochrome element may in all operation states be tailored to be well suited to the electrochrome element.

In the exemplary embodiment of FIG. 2, the electrochrome element driver 2B is particularly well suited for electrochrome elements which constantly consume power when operated in a first direction and consume power for only a short term when operated in a second direction. More specifically, when a control command requests that the transparency of the car rear view mirror glass is reduced, a current is supplied to the electrochrome element 4 via the first supply current path. The electrochrome element capacitor 42 is charged, with the level of charge on the electrochrome element capacitor 42 relating to the level of transparency reduction of the rear view mirror glass. When the static state of the desired transparency level reduction is reached, the electrochrome element 4 may keep consuming a static current, depending on the resistance values of the resistive elements. For large resistance values for the protective resistor 36 and the second electrochrome element resistor 40, the static current may be negligible. But in typical applications, a static current flows, when the electrochrome element is in a reduced transparency state. In this case, the power dissipated in the first variable resistor element 30 generates heat outside the integrated circuit 6. As this heat is generated over an extended period of time, this heat generation outside the integrated circuit 6 is much easier to handle than a heat generation over an extended period of time within the integrated circuit 6. When a control command then requests that maximum transparency should be restored, a supply current in the second supply current path may be directed to the second terminal of the electrochrome element for discharging the electrochrome element capacitor 42 in a controlled manner. This current may be a short term current, wherein the total charge carried by this discharging current may equal the charge previously stored on the electrochrome element capacitor 42 and possibly on the capacitor 34. In this case, the total heat generated by this discharge current in the second variable resistor element 56 is not substantial such that this heat may be absorbed by the integrated circuit 6 itself. Placing the second variable resistor element 56 on the integrated circuit 6 has the advantage that it can be supervised by on-chip diagnostic circuitry and critical voltage/current values can be prevented.

In short, the integrated circuit 6 of the exemplary embodiment of FIG. 2 is configured to provide a two way controlled current supply to an electrochrome element with a very low number of external components. Hence, an electrochrome element driver solution with a high level of integration is provided, wherein the advantages of having the first driving circuit disposed outside the integrated circuit, namely the easier handling of the heat generated in the variable resistor element and the integrated circuit area saved by the positioning of the control loop capacitor outside the integrated circuit, is combined with the advantages of having a second driving circuit disposed on the integrated circuit, namely a high degree of integration/low number of external components. This electrochrome element driver may then advantageously be used for driving any sort of electrochrome element which requires large amounts of power associated with a supply current flow in a first direction and small amounts of power associated with a supply current flow in a second direction. Of course, it may still be used for driving electrochrome elements that require a supply current flow in one direction only or that require small amounts of power associated with both current flow directions.

It can also be thought of further electrochrome element drivers, wherein any subset of the set consisting of the first variable resistor element, the first control loop capacitor, the second variable resistor element and the second control loop capacitor may be disposed on the integrated circuit, whereas the remaining components of this set may be disposed outside of the integrated circuit. For every component, it may be individually determined which placing is appropriate, depending on the size/volume of the component and/or the power dissipation associated with the component and/or additional considerations, such as the insulation requirements of the component.

A fast discharge of the electrochrome element 4 may be achieved by closing the first grounding path switch 66 and the second grounding path switch 60.

Exemplary embodiments, as discussed above, allow for providing an electrochrome element driver that may be connected to a wide variety of electrochrome elements and to a wide range of power source voltages, wherein the power supplied to the electrochrome element is controlled in such a way that an increased life expectancy of the electrochrome element is achieved. Furthermore, a predictable static and dynamic behavior of the electrochrome element may be achieved. Also, the proposed separation of components of the electrochrome element driver disposed on an integrated circuit and of components of the electrochrome element driver disposed outside the integrated circuit allows for a high level of integration while still allowing an easy adaptation of the electrochrome element driver to a particular application by adjusting very few components disposed outside the integrated circuit.

Common electrochrome elements coupleable to the electrochrome element driver according to the inventions are mirrors, such as car, truck or motorcycle mirrors, building windows tintable for blinding reasons or for keeping the heat out of the building in hot weather conditions, glass planes that are supposed to be made non-transparent under special circumstances, such as glass planes between a train driver and the cabin or between a ticket booth and the outside of the ticket booth or in a bank, etc.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electrochrome element driver for supplying electrical power to an electrochrome element, comprising:
   an amplifying circuit having an amplifying circuit control input for controlling a supply current flow to the electrochrome element, an amplifying circuit feedback input and an amplifying circuit output;
   a variable resistor element having a first resistor terminal, a second resistor terminal coupled to the amplifying circuit feedback input and a resistor control terminal for controlling a resistance of the variable resistor element, the resistor control terminal being coupled to the amplifying circuit output, wherein the first resistor terminal is coupleable to a power source and the second resistor terminal is coupleable to a first terminal of the electrochrome element such that a supply current path to the electrochrome element through the variable resistor element is formed; and
   a control loop capacitor coupled to the resistor control terminal for effecting a stable behavior of the supply current flow to the electrochrome element in the supply current path.

2. An electrochrome element driver according to claim 1, comprising an integrated circuit, the integrated circuit comprising the amplifying circuit, with the variable resistor element and the control loop capacitor being positioned outside the integrated circuit.

3. An electrochrome element driver according to claim 1, comprising an integrated circuit, the integrated circuit comprising the amplifying circuit and at least one of the variable resistor element and the control loop capacitor.

4. An electrochrome element driver according to claim 1, wherein the amplifying circuit is a transconductance amplifier.

5. An electrochrome element driver according to claim 1, wherein the amplifying circuit is a folded cascode operational amplifier.

6. An electrochrome element driver according to claim 1, wherein the variable resistor element is a MOSFET transistor.

7. An electrochrome element driver according to claim 2, wherein the integrated circuit comprises a power supply terminal coupleable to a power source and an overcurrent protection switch, the overcurrent protection switch being connected between the power supply terminal and the first resistor terminal.

8. An electrochrome element driver according to claim 2, wherein the integrated circuit comprises a ground terminal coupleable to ground and a fast discharge switch, the fast discharge switch being connected between the second resistor terminal and the ground terminal.

9. An electrochrome element driver according to claim 1, further comprising a capacitor coupled to the second resistor terminal for blocking electromagnetic interference.

10. An electrochrome element driver for supplying electrical power to an electrochrome element, comprising:
    an amplifying circuit having an amplifying circuit control input for controlling a supply current flow to the electrochrome element, an amplifying circuit feedback input and an amplifying circuit output;
    a first driving circuit, comprising:
        a first variable resistor element having a first resistor terminal, a second resistor terminal coupled to the amplifying circuit feedback input in a first operation state and a resistor control terminal for controlling a resistance of the first variable resistor element, the resistor control terminal being coupled to the amplifying circuit output in the first operation state, wherein the first resistor terminal is coupleable to a power source and the second resistor terminal is coupleable to a first terminal of the electrochrome element such that a first supply current path to the electrochrome element through the first variable resistor element is formed, and
        a first control loop capacitor coupled to the resistor control terminal of the first variable resistor element for effecting a stable behavior of the supply current flow to the electrochrome element in the first supply current path; and
    a second driving circuit, comprising:
        a second variable resistor element having a first resistor terminal, a second resistor terminal coupled to the amplifying circuit feedback input in a second operation state and a resistor control terminal for controlling a resistance of the second variable resistor element, the resistor control terminal being coupled to the amplifying circuit output in the second operation state, wherein the first resistor terminal is coupleable to a power source and the second resistor terminal is coupleable to a second terminal of the electrochrome element such that a second supply current path to the electrochrome element through the second variable resistor element is formed, and
        a second control loop capacitor coupled to the resistor control terminal of the second variable resistor element for effecting a stable behavior of the supply current flow to the electrochrome element in the second supply current path;
    wherein the supply current flow is directed to the first terminal of the electrochrome element in the first operation state and is directed to the second terminal of the electrochrome element in the second operation state.

11. An electrochrome element driver according to claim 10, configured to charge the electrochrome element in the first operation state and to discharge the electrochrome element in the second operation state.

12. An electrochrome driver according to claim 10, further comprising:
    a first control path switch connected between the amplifying circuit output and the resistor control terminal of the first variable resistor element,
    a second control path switch connected between the amplifying circuit output and the resistor control terminal of the second variable resistor element,
    a first feedback path switch connected between the second resistor terminal of the first variable resistor element and the amplifying circuit feedback input, and
    a second feedback path switch connected between the second resistor terminal of the second variable resistor element and the amplifying circuit feedback input.

13. An electrochrome element driver according to claim 10, wherein the second resistor terminal of the second variable resistor element is coupled to ground in the first operation state and the second resistor terminal of the first resistor element is coupled to ground in the second operation state.

14. An electrochrome element driver according to claim 13, further comprising:
    a first grounding path switch coupled between the second resistor terminal of the first variable resistor element and ground, and
    a second grounding path switch coupled between the second resistor terminal of the second variable resistor element and ground.

15. An electrochrome element driver according to claim 10, wherein the second resistor terminal of the first variable resistor element and the second resistor terminal of the second variable element are coupled to ground in a fast discharge state.

16. An electrochrome element driver according to claim 10, comprising an integrated circuit, wherein at least one of the variable resistor element and the control loop capacitor of at least one of the first driving circuit and the second driving circuit is included on the integrated circuit, with at least one of the variable resistor element and the control loop capacitor of at least one of the first driving circuit and the second driving circuit being positioned outside the integrated circuit.

17. An electrochrome element driver according to claim 10, comprising an integrated circuit, wherein the first driving circuit is positioned outside the integrated circuit and the second driving circuit is positioned on the integrated circuit.

18. An electrochrome element driver according to claim 10, comprising an integrated circuit, wherein the first driving circuit and the second driving circuit are disposed on the integrated circuit.

19. An electrochrome element driver according to claim 10, comprising an overcurrent protection switch connected between one of the first resistor terminal of the first variable resistor element and the first resistor terminal of the second variable resistor element and a power source terminal coupleable to a power source.

20. An electrochrome element driver according to claim 10, comprising a capacitor for blocking electromagnetic interference, the capacitor being coupled to one of the second resistor terminal of the first variable resistor element and the second resistor terminal of the second resistor element.

21. An electrochrome element driver according to claim 10, wherein the amplifying circuit is a transconductance amplifier.

22. An electrochrome element driver according to claim 10, wherein the amplifying circuit is a folded cascode operational amplifier.

23. An electrochrome element driver according to claim 10, wherein at least one of the first variable resistor element and second the variable resistor element is a MOSFET transistor.

24. An integrated circuit module for an electrochrome element driver for supplying electrical power to an electrochrome element, comprising:
- a power source terminal coupleable to an external power source,
- a safe power supply terminal,
- an exterior control terminal,
- an electrochrome element connection terminal,
- an overcurrent protection switch connected between the power source terminal and the safe power supply terminal,
- an amplifying circuit having an amplifying circuit control input for controlling a supply current flow to the electrochrome element, an amplifying circuit feedback input coupled to the electrochrome element connection terminal and an amplifying circuit output coupled to the exterior control terminal;
- wherein the integrated circuit module is coupleable to a variable resistor element having a first resistor terminal, a second resistor terminal and a resistor control terminal for controlling a resistance of the variable resistor element, to a control loop capacitor and to an electrochrome element having a first terminal and a second terminal, with the safe power supply terminal being coupleable to the first resistor terminal, the exterior control terminal being coupleable to the resistor control terminal and to the control loop capacitor, and the electrochrome element connection terminal being coupleable to the second resistor terminal and to the first terminal of the electrochrome element,
- such that a stable behavior of the supply current flow to the electrochrome element is provided by the control loop capacitor and current levels of the supply current flow critical for the integrity of the variable resistor element are prevented by the overcurrent protection switch.

25. An integrated circuit module according to claim 24, further comprising:
- a ground terminal coupleable to ground, and
- a fast discharge switch, the fast discharge switch being connected between the electrochrome element connection terminal and the ground terminal.

26. An integrated circuit module for an electrochrome element driver for supplying electrical power to an electrochrome element, comprising:
- an exterior control terminal,
- a first electrochrome element connection terminal, and
- a second electrochrome element connection terminal,
- wherein the integrated circuit module is coupleable to a first variable resistor element having a first resistor terminal coupleable to a power source, a second resistor terminal and a resistor control terminal for controlling a resistance of the first variable resistor element, to a first control loop capacitor and to an electrochrome element having a first terminal and a second terminal, with the exterior control terminal being coupleable to the resistor control terminal of the first variable resistor element and to the first control loop capacitor, the first electrochrome element connection terminal being coupleable to the second resistor terminal of the first variable resistor element and to the first terminal of the electrochrome element, and the second electrochrome element connection terminal being coupleable to the second terminal of the electrochrome element,
- wherein the integrated circuit module further comprises:
  - an amplifying circuit having an amplifying circuit control input for controlling a supply current flow to the electrochrome element, an amplifying circuit feedback input coupled to the first electrochrome element connection terminal in a first operation state and coupled to the second electrochrome element connection terminal in a second operation state, and an amplifying circuit output coupled to the exterior control terminal in the first operation state;
  - a second variable resistor element having a first resistor terminal coupleable to a power source, a second resistor terminal coupled to the second electrochrome element connection terminal and a resistor control terminal coupled to the amplifying circuit output in the second operation state,
  - a second control loop capacitor coupled to the resistor control terminal of the second variable resistor element,
  - such that a stable behavior of the supply current flow to the first terminal of the electrochrome element is provided by the first control loop capacitor and such that a stable behavior of the supply current flow to the second terminal of the electrochrome element is provided by the second control loop capacitor.

27. An integrated circuit module according to claim 26, comprising at least one ground terminal, wherein the first electrochrome element connection terminal is coupled to one of the at least one ground terminal in the second operation state and the second electrochrome element connection terminal is coupled to one of the at least one ground terminal in the first operation state.

28. An integrated circuit module according to claim 26, comprising:
- a first control path switch connected between the amplifying circuit output and the exterior control terminal,
- a second control path switch connected between the amplifying circuit output and the resistor control terminal of the second variable resistor element,
- a first feedback path switch connected between the first electrochrome element connection terminal and the amplifying circuit feedback input, and
- a second feedback path switch connected between the second electrochrome element connection terminal and the amplifying circuit feedback input.

29. An integrated circuit module according to claim 27, comprising:
- a first grounding path switch coupled between the first electrochrome element connection terminal and one of the at least one ground terminal, and
- a second grounding path switch coupled between the second electrochrome element connection terminal and one of the at least one ground terminal.

30. An integrated circuit module according to claim 26, comprising:
- at least one power source terminal coupleable to an external power source,
- a safe power supply terminal coupleable to the first resistor terminal of the first variable resistor element, and
- an overcurrent protection switch connected between one of the at least one power source terminal and the safe power supply terminal such that current levels of the supply current flow to the first terminal of the integrated circuit module critical for the integrity of the first variable resistor element are prevented by the overcurrent protection switch.

* * * * *